(No Model.) 2 Sheets—Sheet 1.
A. KAISER.
DEVICE FOR CONVERTING MOTION.
No. 300,871. Patented June 24, 1884.
Fig. 5.     Fig. 1.     Fig. 9.
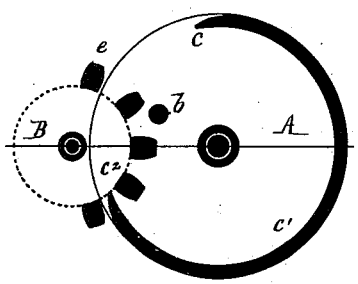 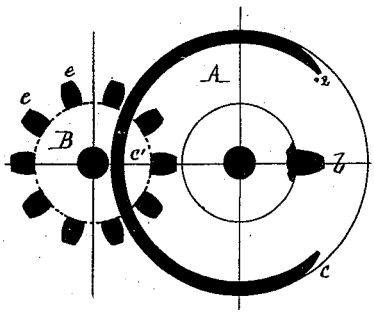 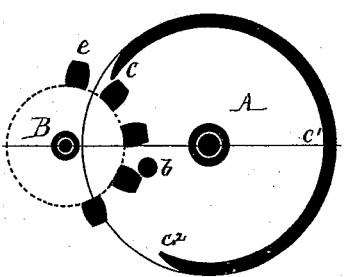
Fig. 6.     Fig. 2.     Fig. 10.
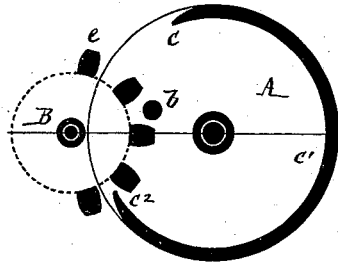 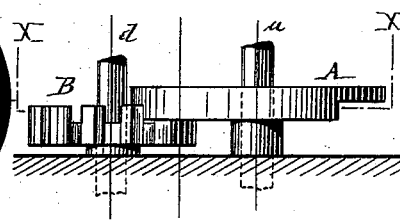 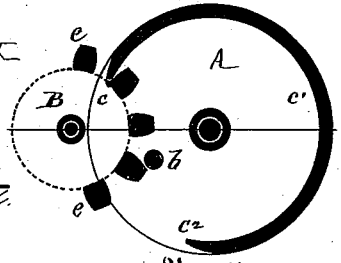
Fig. 7.     Fig. 3.     Fig. 11.
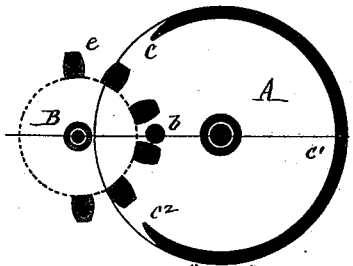 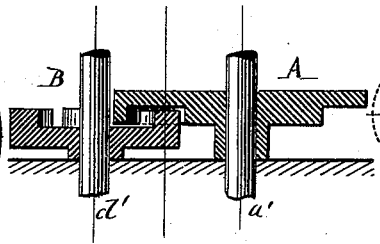 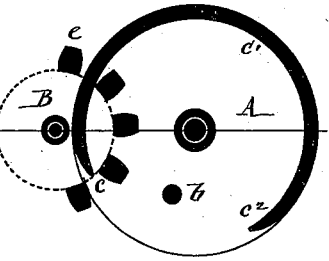
Fig. 8.     Fig. 4.     Fig. 12.
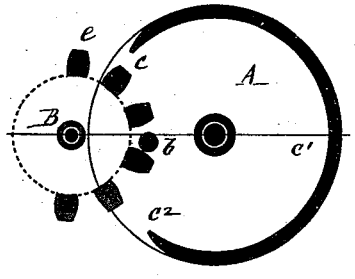 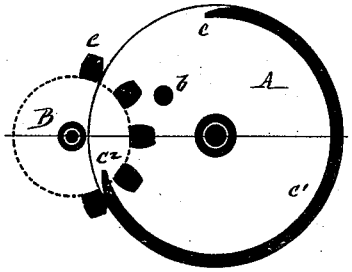 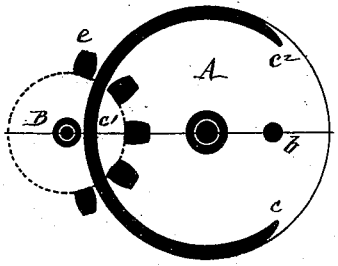
WITNESSES:                     INVENTOR
J. H. Rosenbaum.             Alexander Kaiser
Martin Petry             BY Goepel & Raegener
                                     ATTORNEYS.

(No Model.) 2 Sheets—Sheet 2.
A. KAISER.
DEVICE FOR CONVERTING MOTION.
No. 300,871. Patented June 24, 1884.
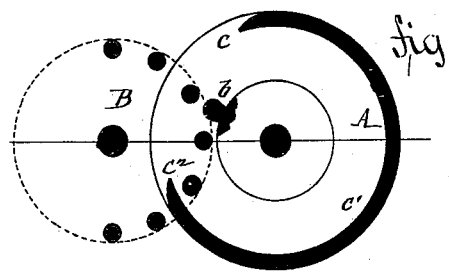
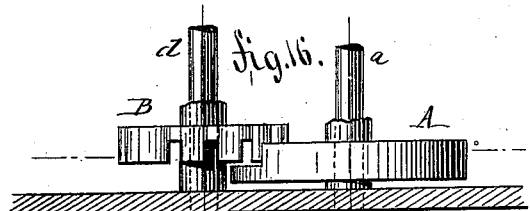
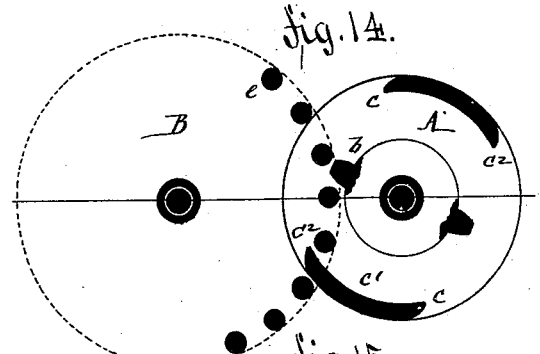
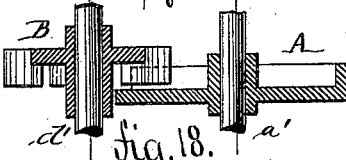
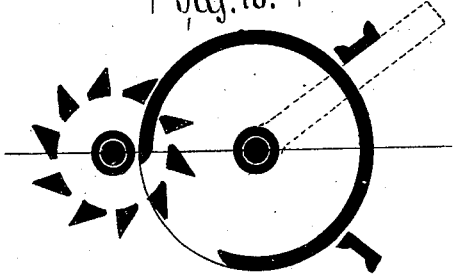
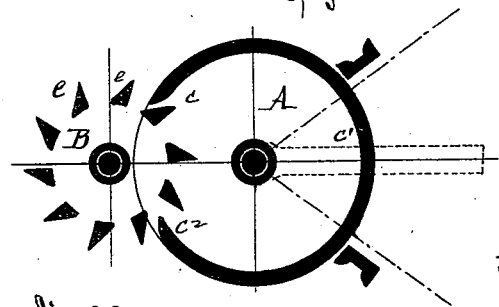
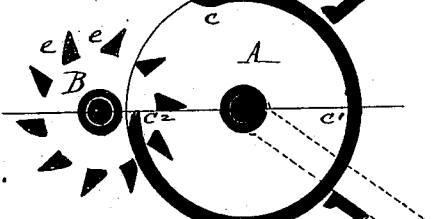
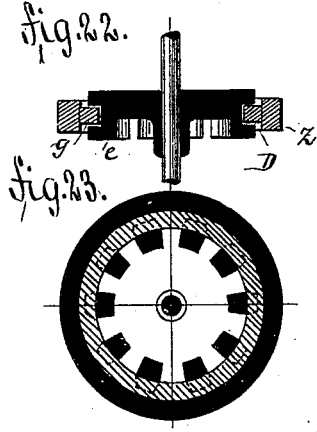
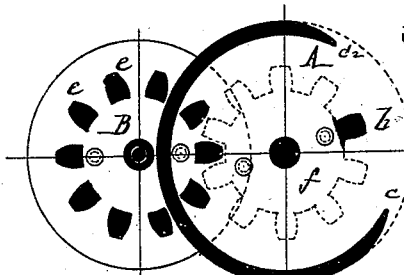
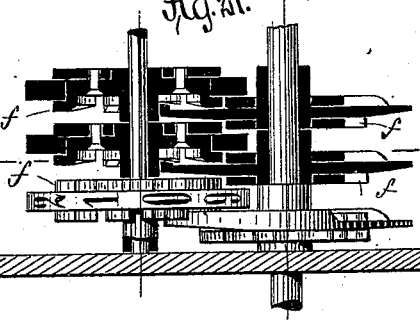
WITNESSES:
Jos. H. Rosenbaum.
Martin Petry.
INVENTOR
Alexander Kaiser.
BY Goepel & Raegener
ATTORNEYS.

UNITED STATES PATENT OFFICE.

ALEXANDER KAISER, OF FREIBURG, SWITZERLAND.

DEVICE FOR CONVERTING MOTION.

SPECIFICATION forming part of Letters Patent No. 300,871, dated June 24, 1884.

Application filed November 8, 1883. (No model.) Patented in England January 9, 1883, No. 131, and in Italy February 15, 1883, No. 15,076-85.

*To all whom it may concern:*

Be it known that I, ALEXANDER KAISER, of the city of Freiburg, in the Republic of Switzerland, have invented certain new and useful Improvements in Gearings, (which have been patented by the Government of Italy, dated February 15, 1883, numbered 15,076-85, and by the Government of Great Britain, dated January 9, 1883, and numbered 131,) of which the following is a specification.

My invention relates to improvements in gearings for changing continuous rotary motion or rotary reciprocating motion into intermittent rotary motion, such as is required for registering apparatus and for other purposes; and it consists in particular in a peculiar arrangement of parts by which the driven wheel is locked by the rotating driving-wheel during its intervals of motion, as will more fully appear hereinafter, and finally be pointed out in the claims.

In the accompanying drawings, Figures 1 to 14 represent my invention as applied for changing continuous rotary motion into intermittent rotary motion. Figs. 15 to 19 represent it as applied to the transformation of rotary reciprocating motion into intermittent rotary motion. Figs. 20 and 21 show a train of register-wheels with my improvements, and Figs. 22 to 25 show methods of securing dial-rings upon the wheels.

Similar letters of reference indicate corresponding parts.

In Figs. 1 to 12, A is the driving-wheel, which, as shown, makes ten revolutions to one of the driving-wheel B, the latter having ten teeth, $e\ e$, while the wheel A has but one raised tooth or pin $b$. The teeth $e\ e$ of the wheel B project from the flat surface of the disk in the same manner as in ordinary so-called "face-gear." The driving-wheel A is provided with a segmental flange, $c\ c'\ c^2$, which extends around a part—say two-thirds—of the circumference of the wheel A, and which constitutes, in combination with the teeth of the wheel B, the locking device, as the segmental flange interposes itself between the teeth, and prevents the wheel B from moving, except when the tooth $b$ of the wheel A moves the wheel B forward for the tooth. The ends of the flange $c\ c'\ c^2$ are beveled off, so as to facilitate the entering of the flange into the interstices between the teeth $e\ e$ of the wheel B.

Figs. 4 to 12 show the successive relative positions of the wheels A and B during one revolution of the wheel A, and fully explain their operation. This arrangement is perfectly reliable, and dispenses with the use of pawls or springs. It makes it impossible for the tooth of the driver to strike against or be jammed by the teeth of the driven wheel. The wheel B is securely locked when required. Dust, oxidation, or wear cause no disturbance, and the teeth of the wheels may be of any desired shape. The wheels A and B may, according to circumstances, be fast or loose on the respective shafts.

Fig. 13 shows the above-described arrangement with twelve teeth on the wheel B.

In Fig. 14 the wheel A has two teeth and two segmental flanges.

For registering apparatus a number of the above-described devices may be used, together with ordinary gears $f$, as represented in Figs. 20 and 21.

In Figs. 15 to 19 the driving-wheel A has a rotary reciprocating motion. In this case the tooth $b$ of the wheel A is omitted, the beveled ends of the segmental flange $c\ c'\ c^2$ taking its place, said beveled ends acting against the inclined surfaces of the teeth $e\ e$, each end moving the wheel B forward for one tooth with each oscillation of the wheel A. In this arrangement the flange never leaves the teeth of the wheel B entirely, as shown by the different relative positions of the wheels Figs. 15, 18, and 19, thus rendering the missing of a tooth or jamming impossible.

Figs. 22 and 23 show how porcelain dial-rings may be secured upon the wheels B by fastening them upon rubber rings inserted into notches $g$ of the teeth $e$, whereby the dials are protected from jars and from strains due to expansion or other causes.

Figs. 24 and 25 show the arrangement of my improved gear with metallic dial-rings.

Having thus described my invention, I claim as new and desire to secure by Letters Patent—

1. In mechanism for transmitting continuous or reciprocating rotary motion into intermittent rotary motion, the combination of a rotating driving-wheel having a segmental flange extending around a part of its circumference with a toothed driven wheel, said flange interlocking intermittently with the teeth of the driven wheel, substantially as set forth.

2. In mechanism for changing continuous rotary motion into intermittent rotary motion, the combination of a rotating driving-wheel, A, having a raised tooth, $b$, and a segmental flange, $c\ c'\ c^2$, with a toothed driven wheel, B, said flange interlocking intermittently with the teeth of the driven wheel, substantially as shown and described.

3. In mechanism for changing continuous rotary motion into intermittent rotary motion, the combination of a rotating driving-wheel, A, having one or more raised teeth, $b$, and one or more segmental flanges, $c\ c'\ c^2$, said flange or flanges having beveled ends with a driven wheel, B, having raised teeth, $e\ e$, which latter interlock with the flange or flanges during the intervals of motion imparted to the driven wheel by the tooth or teeth of the driving-wheel, substantially as specified.

In testimony that I claim the foregoing as my invention I have signed my name in presence of two subscribing witnesses.

ALEXANDER KAISER.

Witnesses:
B. ROI,
HUGO WILOSS.